March 28, 1961   A. D. F. MONCRIEFF   2,976,984
AUTOMATIC CONVEYOR FOR GEAR FINISHING MACHINES
Original Filed Feb. 20, 1950   4 Sheets-Sheet 1
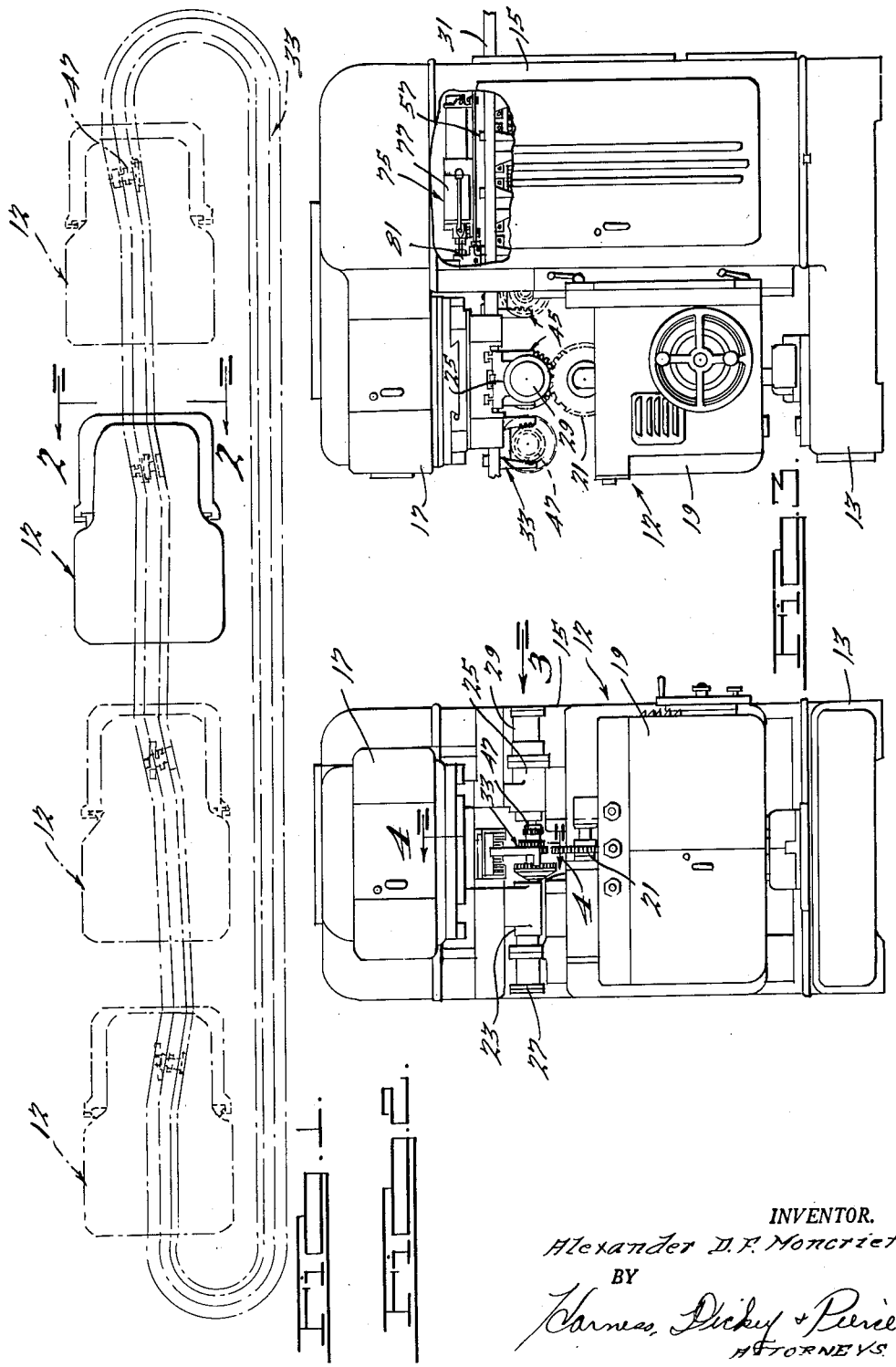
INVENTOR.
Alexander D. F. Moncrieff
BY
Barnes, Dickey & Pierce.
ATTORNEYS

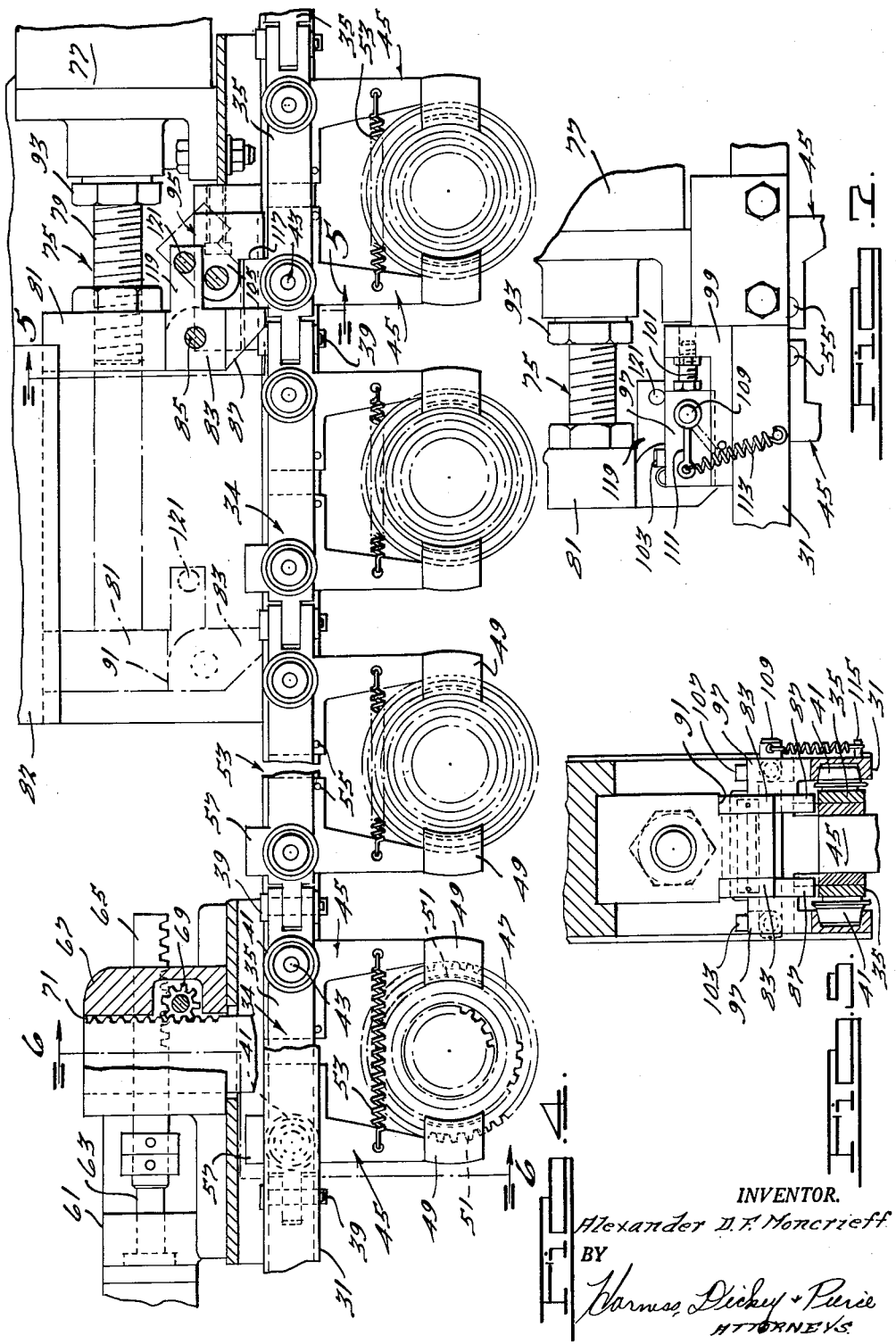

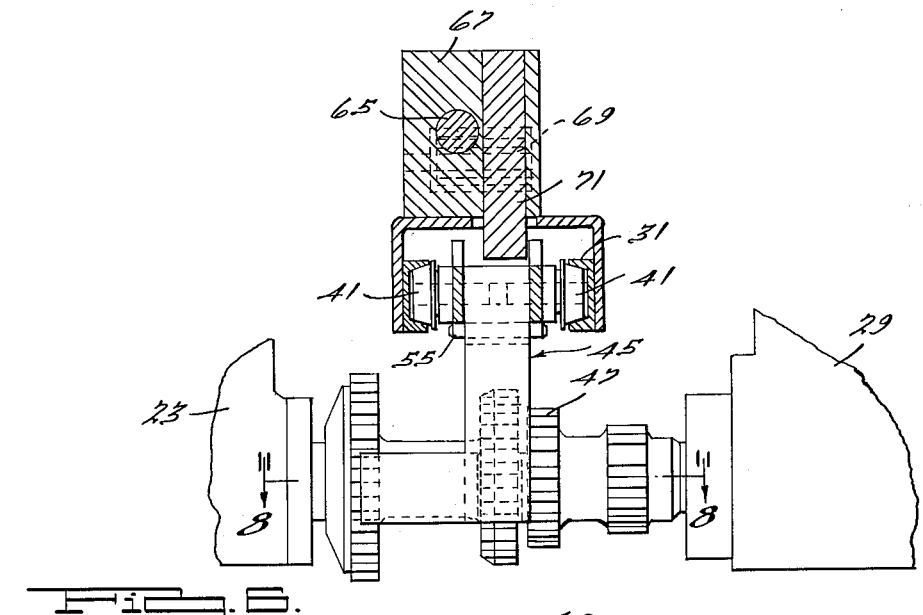
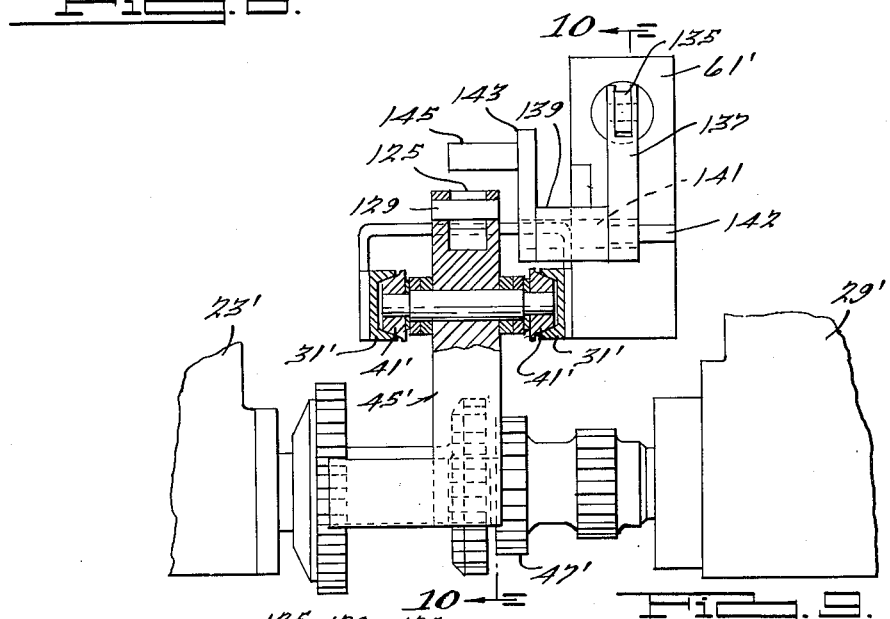
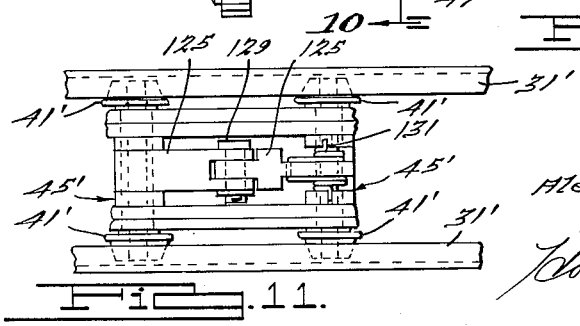

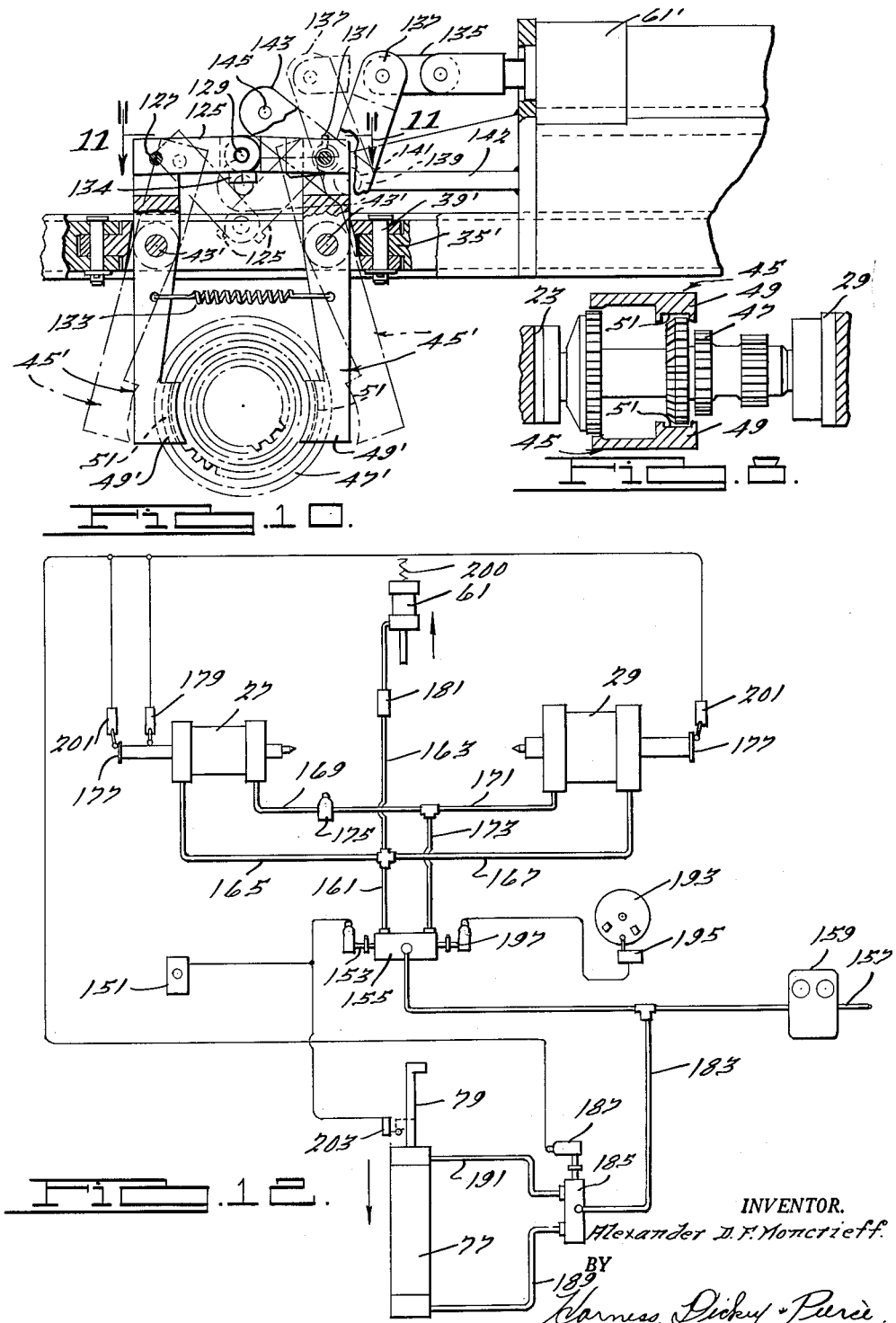

United States Patent Office 2,976,984
Patented Mar. 28, 1961

2,976,984

AUTOMATIC CONVEYOR FOR GEAR FINISHING MACHINES

Alexander D. F. Moncrieff, Detroit, Mich., assignor to Michigan Tool Company, Detroit, Mich., a corporation of Delaware Original application Feb. 20, 1950, Ser. No. 145,140, now Patent No. 2,736,238, dated Feb. 28, 1956. Divided and this application July 28, 1955, Ser. No. 525,034

2 Claims. (Cl. 198—179)

This invention relates to an automatic conveyor mechanism for metalworking machines such as gear finishing machines, or the like. This application is a division of my copending application Serial No. 145,140 filed February 20, 1950, now Patent No. 2,736,238.

It is an object of this invention to provide automatic conveyor mechanism for conveying workpieces into and out of position for engagement by work-engaging elements of a gear finishing machine, or the like, in which work-engaging elements of the machine will automatically engage the workpiece when the latter is in the aforementioned position, the workpiece will be released by the conveyor after such engagement, and during the operating cycle of the machine, the workpiece will again be engaged by the conveyor after the operation and the work-engaging elements of the machine will release the workpiece prior to the automatic indexing or movement of the conveyor to carry the workpiece away from the machine.

It is a still further object of this invention to provide a conveyor mechanism of the aforementioned type, which may be employed with a plurality of the aforementioned machines, so that the workpieces will be automatically conveyed from one machine to another for successive machining operations, without the necessity of an operator having to touch or position the workpieces or machines.

It is a still further object of this invention to provide a novel conveyor mechanism of the aforementioned type including novel means for indexing or moving the conveyor and then holding the same in the indexed position, as well as novel means for automatically releasing a workpiece from the conveyor when the workpiece is engaged by work-engaging elements of a machine.

It is a still further object of this invention to provide an automatic conveyor of the aforementioned type, which is relatively simple in construction, inexpensive to manufacture, and fully automatic in operation, so that the necessity of manually transferring workpieces from one machine to another, or manually loading workpieces into machines is eliminated.

It is a still further object of this invention to provide an automatic conveyor of the aforementioned type, which is adapted to support unfinished workpieces and convey the workpieces through a plurality of work-performing stations so that various operations may be performed on the workpiece and the workpiece completely finished without the necessity of an operator handling the workpiece at any time throughout the work-performing operations.

It is a still further object of this invention to provide means for a conveyor of the aforementioned type for releasably supporting a gearlike workpiece in such a manner that when the workpiece moves into engagement with a toothed gear cutter or the like, the workpiece may rotate in the supporting means and roll into proper engagement with the toothed gear cutter, or the like.

These and other objects of this invention will become apparent from the following detailed description, taken in conjunction with the accompanying drawings, in which:

Figure 1 is a diagrammatic top plan view of the conveyor of this invention and its relationship with a plurality of gear finishing machines;

Figure 2 is an enlarged view, partially in section and partially in elevation, of the structure illustrated in Fig. 1, taken along the line 2—2 thereof;

Figure 3 is a side elevational view of the structure illustrated in Fig. 2, taken in the direction of the arrow 3 thereof;

Figure 4 is an enlarged fragmentary sectional view of the structure illustrated in Fig. 2, taken along the line 4—4 thereof;

Figure 5 is a fragmentary sectional view of the structure illustrated in Fig. 4, taken along the line 5—5 thereof;

Fig. 6 is a fragmentary sectional view of the structure illustrated in Fig. 4, taken along the line 6—6 thereof;

Figure 7 is a fragmentary side elevational view of a portion of the indexing mechanism illustrated in Fig. 4;

Figure 8 is a fragmentary sectional view of the structure illustrated in Fig. 6, taken along the line 8—8 thereof;

Figure 9 is a fragmentary sectional view similar to Figure 6, showing a further embodiment of the conveyor of this invention;

Figure 10 is a fragmentary view partially in section and partially in elevation, of the structure illustrated in Fig. 9, taken along the line 10—10 thereof;

Figure 11 is a fragmentary elevational view of the structure illustrated in Fig. 10, taken along the line 11—11 thereof; and Figure 12 is a diagrammatical view of the fluid and electrical operating circuits of the mechanism of this invention.

The automatic conveyor of this invention may be used in conjunction with a plurality of metalworking machines such as gear-finishing machines or the like, or may be used in conjunction with merely one machine, to automatically position workpieces for engagement by work-supporting or engaging elements of one or a plurality of machines. For the purpose of illustration, the conveyor is shown in the drawings in conjunction with a plurality of gear finishing machines 12. The gear-finishing machines illustrated in the drawings are of the type illustrated in the copending patent application of Alexander D. F. Moncrieff and James Martin for Improvements in Gear Shaving Machine, Serial No. 6,488, filed February 5, 1948, now abandoned.

As can be best seen in Figures 2 and 3, each gear-shaving machine includes a base 13, supported on the floor or the like, a vertical hollow column or housing 15, extending upward from the rear portion of the base, a fixed head 17, supported by and projecting forwardly from the vertical column 15, at the upper end thereof, and a hollow column 19 connected to the front face of the vertical column 15 for vertical movement with respect thereto. A gearlike shaving tool 21 is rotatably supported on the upper face of the column 19 and is adapted to be rotatably driven through a suitable drive mechanism, not herein described. A headstock 23 is supported on the fixed machine head 17 for reciprocation with respect thereto, and a tailstock 25 is likewise reciprocably supported on the work head 17, in any suitable manner. A fluid operated piston and cylinder unit 27 is connected with the headstock 23 for reciprocating the latter, and a piston and cylinder unit 29 is connected with the tailstock 25 for the same purpose, as will hereinafter appear.

A plurality of the gear finishing machines 12 are shown in Fig. 1, in spaced relationship, one behind the other. An endless conveyor track 31 extends through the machines 12, underneath the fixed head 17, and through the vertical column 15 of each machine. The track is reversely curved at each end of the group of machines and a portion of the track extends along one side of the group of machines, generally parallel to the track portion extending through the machines. A conveyor 33 is movably supported on the track 31 and includes a plurality of link sections 34, each of which includes a pair of side by side links 35, which have their opposite ends pivotally interconnected in any suitable manner such as by vertical pivot pins 39. Rollers 41 are rotatably supported on each link section, adjacent the opposite ends thereof, by means of pins or axles 43, and the rollers engage the track for movably supporting the links thereon. The links are thus free to move around and along the track 31. Workpiece supporting means in the form of a pair of jaw elements 45 are supported on each link section 34 of the conveyor for engaging and supporting a workpiece 47, of any suitable type, as will be hereinafter described.

The jaws 45 illustrated in Figure 4 are of an inverted L-shaped and have the lower ends 49 of their vertical leg portions shaped and formed to engage and support the workpiece 47, which is shown, by way of illustration, as a gear cluster. As can be seen in Figure 8, the lower jaw ends 49 have their inner faces 51 recessed and arcuately shaped for engaging certain of the gear portions of the gear cluster so as to support the entire cluster. The jaws 45 while supporting the gear cluster permit the cluster to rotate, while so supported, for a reason which will hereinafter appear. However, it will be appreciated that the lower ends 49 of the jaws may be shaped in any suitable manner to engage any suitable type of workpieces, such as single gears, or the like. The jaws 45, at the upper ends of the vertical portions, are pivotally connected to the axles or pins 43, between the pairs of links 35, so that the lower ends of each pair of jaws may swing toward or away from each other to engage or release a workpiece. A coil spring 53 extends between the jaws below the track 31 for yieldably urging the lower ends of the jaws toward each other and into engagement with the workpiece. Inward movement of the lower ends of the jaws is limited by pins 55 extending through the jaws and engageable with the under side of links 35. The horizontal upper portions of the jaws 45 of each pair terminate in close proximity to each other and are movable downwardly around the axes of their pivot pins 43. Each pair of links 35 is provided with upstanding projections 57, which project above the track 31, for a reason which will hereinafter appear.

A workpiece or gear 47 may be positioned by an operator between each pair of jaws 45 by merely inserting it between the lower ends of the jaws and expanding the springs 53. In order to release the workpiece from the conveyor for engagement by the head and tail stocks 23 and 25 respectively of each machine 12, as hereinafter appears, means are provided for automatically opening the jaws. In the embodiment illustrated in Figures 4 through 6, the mechanism for opening each pair of jaws comprises an air cylinder 61, which is suitably supported on the track 31, above the gear cutter 21 of each machine. The air cylinder 61 may be of any suitable type and is provided with a piston rod 63, which has its forward or projecting end connected with a gear rack 65. The gear rack 65 extends through a housing 67, which is likewise supported on the track 31 above the head and tail stock of each machine. The gear rack 65 meshes with a gear 69, which is rotatably supported in the housing 67, and the gear 69 in turn meshes with a vertical rack 71, the lower end of which projects through the bottom of the housing 67 and the housing supporting structure. The lower end of the member 71 is constructed so that it may move downwardly between the links of each link section 34, disposed therebelow, and engage the top surfaces of the inner ends of the horizontal portions of each pair of jaws 45.

Therefore, when the air cylinder 61 is actuated so as to move the piston rod 63 and thus the rack 65 and gear 69, the rack 71 will move downwardly to engage the top of jaws 45 and pivot the same about the axes of the pivot pins 43, so as to swing the lower ends of the jaws away from each other against the action of the spring 53, and thus release the workpiece 47 from engagement with the jaws. One jaw actuating mechanism is provided adjacent each machine and a pair of jaws 45 is connected with each link section 34 of the conveyor. Thus, the only time a pair of jaws will be opened to release the workpiece is when the jaws are disposed adjacent to the work-engaging elements or head and tail stock of a machine, and are actuated by the jaw actuating mechanism at a time and in a manner hereinafter described.

In order to index the conveyor so as to successively place workpieces in a position for engagement by the head and tail stock of a machine, an indexing mechanism 75 is provided, which may be located at any convenient point along the conveyor, but is shown in Figure 3 as being supported in the vertical column 15 of one of the machines 12. The indexing mechanism 75 includes an actuating device 77 of any suitable type, such as a combined air and hydraulically operated cylinder, which causes a steady, smooth actuation or movement of its piston rod 79 on the indexing stroke and a rapid return or retraction for the next indexing stroke. The piston rod 79 is connected to a vertically extending, blocklike member 81, which is guided for fore and aft movement by member 82, supported on track 31. A pair of indexing pawls or fingers 83 are pivotally connected with the member 81 by any suitable means, such as pivot pin 85. Two of the fingers 83 are provided, one on each side of member 81, with their lower ends disposed just above the top surfaces of the links 35 of the conveyor.

The left hand face of each index finger 83, as viewed in Figure 4, is cut back or angled at 87, for a reason which will hereinafter appear, and the lower edge of each finger extends below the top surface of the link projections 57. When the piston rod, as viewed in Figure 4, moves to the left (as indicated in dot and dash lines), the indexing fingers 83 can cam or pivot over the link projections 57 by pivoting about the axis of the pivot pin 85. The weight of the fingers 83 will tend to return them to their normal vertical position after they have been cammed, and they are prevented from rotating in the opposite direction beyond their vertical position by shoulders 91 on the member 81, which engage the upper surfaces of the fingers. Therefore, when the piston rod 79, as viewed in Figure 4, moves to the right, the fingers 83 will engage the link projections 57 and move the entire conveyor therewith until the piston has reached the end of its retraction stroke, at which time the stop nut 93 on the piston rod abuts the end of the cylinder 77. Thus, the indexing fingers 83 and the member 81 will move between the dot and dash line position shown in Figure 4, and the solid line position, so as to index the conveyor and move a workpiece into position for engagement by the work-engaging elements of the machine. When a workpiece, such as a gear, or gear cluster, is so positioned, it will engage the peripheral portion of the gear cutter 21, and as the gear can rotate in the jaws, it will roll into proper engagement or mesh with the cutter, so that when the cutter is rotatably driven it will be in proper engagement with the workpiece.

After the conveyor has been indexed so as to properly position workpieces, supported in the sets of jaws 45, in the proper location for engagement by the head and tail stocks of the machines 12, it is important that the conveyor not be able to walk or move. Therefore, a positive stop or lock mechanism 95 is provided for retaining the conveyor in place once it has been indexed.

This mechanism includes a pair of opposed blocks or plates 97, which are supported for fore and aft adjustment in members 99, connected with the track 31, on each side thereof. Suitable studs 101 are threaded in members 99, which engage blocks 97 so as to insure positive positioning of the blocks or plates 97. Each block or plate 97 is secured to the track, in its proper position by means of cap screws 103. Disposed between the blocks or plates 97 are two stop elements 105, which are of an inverted L-shape and each of which has its horizontal portion pivotally connected with the blocks or plates 97 by means of a suitable pin or axle 109. An arm 111 extends from the axle 109, exteriorly of one of the blocks 97, and a coil spring 113 has its upper end connected to the free end of arm 111 and its lower end connected to a pin 115 connected to the track 31. The spring 113 is elongated so as to normally rotate the arm 111 downwardly and thus rotate the stop elements 105, as viewed in Figure 4, in a counterclockwise direction, so that the vertical face 117 of each stop element 105 is disposed above the link projections 57. The indexing member 81 is provided with a rearwardly extending, generally rectangular portion 119, which carries a horizontal pin 121.

When the indexing fingers 83 engage one face of one set of the conveyor link projections 57, so as to index the conveyor, the pin 121, when the piston is moving to its retracted position, will engage the upper surface of the stop elements 105 so as to cam or pivot the latter in a clockwise direction, against the action of the spring 113, so that the vertical faces 117 of the stop elements will engage the opposite faces of the link projections 57, so that the link projections of the conveyor are held against movement, thus preventing any walking or undesirable movement of the conveyor until the piston rod is again extended so as to move the member 81 and pin 121 away from the stop elements. When the pin 121 moves out of engagement with the stop elements 105, the stop elements will be pivoted away from the link projections 57 by the spring 113, so as not to interfere with the next indexing operation.

In the embodiment of the invention illustrated in Figures 9 through 11, a different conveyor workpiece supporting construction and actuating mechanism therefor is illustrated. The jaws 45' of the structure illustrated therein, extend vertically above and below the conveyor track and are pivotally connected to the conveyor links 35', intermediate their ends, by the pins 43'. A pair of generally horizontally extending links 125 are disposed between the jaws and have their outer ends pivotally connected to the jaws 45' by means of pivot pins 127. The inner adjacent ends of the links 125 overlap and are pivotally interconnected by means of a pivot pin 129. A hairpin type spring 131 extends around one of the pivot pins 127 and has its opposite ends engaging one of the jaws and an additional spring 133 extends between the jaws below the track 31, not for the purpose of maintaining the jaws in engagement with the workpiece 47', but to return the jaws to their engaging position after actuation, as will hereinafter appear. When the lower ends of the jaws 45' engage the workpiece, the pivot pin 129, at the junction of links 125, is disposed above the horizontal axis of the pivot pins 127, so that the inner or adjacent ends of the links are disposed vertically above or over center and will, therefore, lock the jaws in engagement with the workpieces so as to prevent the lower ends thereof from moving away from each other. Shoulder 134 is provided on one link for limiting the over center movement of the links. Thus, a positive lock, rather than a yieldable lock, as in the previous construction, is provided.

In order to break this positive lock and actuate the jaws, the piston rod 63' of the air cylinder 61' has a link 135 connected therewith, which in turn is pivotally connected with the upper end of a generally vertically extending link 137. The lower end of the vertically extending link 137 has a bushing 139 rigidly connected therewith. An axle or pin 141 extends through the bushing 139 and is rigidly connected with a stationary portion 142 of the cylinder supporting structure. The opposite end of the bushing 139 is connected with one end of an angularly extending link 143, which in turn carries a laterally projecting pin 145 adjacent the free end thereof. When the piston rod is extended the linkage will pivot about the pin 141 and the pin 145 on the end of the link 143 will move downwardly to engage the links 125 at their point of pivotal interconnection, thereby breaking the over center link lock and moving the links downwardly, which in turn will cause the lower ends of the jaws to move outwardly and release the workpiece therefrom, as shown in dot and dash lines in Figure 10. When the piston rod is retracted the pin 145 moves out of engagement with the links 125 and the springs 133 and 131 will return the jaws 45' and the links 125 to their normal position wherein the links will be in their over centered locked relationship and the jaws will be in engagement with a workpiece.

Referring now to Figure 12, which is a diagrammatical view of the operating circuit of the conveyor mechanism, the automatic operation of the conveyor and machines can be seen. It should, however, be understood that the diagrammatic circuit shown in Figure 12 is for only one machine 12, and when more than one machine is used a plurality of circuits like the one herein shown are employed and are connected together in series, but in order to conserve space and eliminate duplication, only a circuit for one machine is illustrated, except only one indexing mechanism is employed irrespective of the number of machines used.

In order to start the operating cycle, an operator opens a valve to permit fluid to flow to the system through conduit 157 and filter 159, and pushes a start button 151, which energizes a solenoid 153, which is connected with a conventional four-way fluid valve 155, in a conventional manner. The energization of the solenoid 153 actuates the valve 155 so that the fluid under pressure flowing through conduit 157 will flow through the valve to conduit 161 and from conduit 161 to conduit 163, leading to the air cylinder 61 or 61' of the jaw releasing mechanism, and through conduits 165 and 167, to the outer ends of cylinders 27 and 29, which actuate the head and tail stocks 23 and 25, respectively, of the machine 12. The flow of fluid through the conduits 165 and 167 will cause the cylinders to actuate the head and tail stocks and move the latter inwardly. It will, of course, be appreciated that at the start of the cycle of operation the conveyor has been indexed or positioned so that at least one workpiece supported by a pair of jaws is disposed in a position between the head and tail stock of each machine. The machines and the conveyor elements are so spaced that when one workpiece is disposed between the head and tail stock of one machine, one other workpiece will be disposed between the head and tail stock of each other machine, although many other workpieces may be disposed between the workpieces adjacent the machines. Still further, it will be noted in Figure 1 that the conveyor track 31 is so arranged adjacent each machine 12 that the workpieces will be properly presented to the head and tail stock of each machine so that when the head and tail stock move inwardly they will engage the workpiece to properly support it.

Fluid in the opposite end of cylinders 27 and 29 will flow through conduits 169 and 171 to conduit 173, through the four-way valve 155 and be discharged through a suitable outlet, if the fluid is air, or flow to a fluid reservoir in a conventional manner, if the fluid is hydraulic liquid. A check valve 175 is provided in conduit 169 so that the flow of fluid from cylinder 27 through conduit 169 will be slower than the flow of fluid from cylinder 29 through conduit 171. Thus, the tail stock will move into engagement with the workpiece ahead of the head stock. When the cylinder 27 has been fully actuated by the fluid flowing through conduit 165, a projection 177 on the end of its piston rod will engage and actuate a limit switch 179, for a reason which will hereinafter appear. When the cylinders are fully actuated, fluid pressure in the conduits 165, 167 and 163 will increase and when the pressure in conduit 163 increases to a predetermined value it will blow off or open a check valve 181 in conduit 163 so as to actuate the cylinder 61 or 61' of the jaw release mechanism, and thereby cause the jaws to open and release the workpiece 47. The workpiece is thus supported on the machine and the gear shaving or other machining operation then takes place.

In the meantime, fluid in conduit 157 flows through a conduit 183 to a four-way valve 185, which is actuated in one direction by a solenoid 187, and in the opposite direction by any suitable means, such as a spring. The fluid flowing through conduit 183 and four-way valve 185 will flow through conduit 189 to one end of the indexing cylinder 77, so as to cause the indexing cylinder to extend its piston rod and move the same to a position ready for the next indexing operation. Fluid in the opposite end of the cylinder 77 will flow through conduit 191 and be discharged through the valve 185. When limit switch 179 is actuated, as previously described, the cycle of operation of the machine 12 is started. The machine includes a suitable timer mechanism 193, which at the completion of the machining cycle, actuates a limit switch 195, which in turn actuates a solenoid 197 which is connected with the four-way valve 155, so as to shift the valve 155 so that fluid in the conduit 161 will be discharged. Therefore, there is no longer any fluid pressure acting on the jaw release mechanism cylinder 61, and the piston of this cylinder will return to its retracted position under the operation of a spring 200, or the like, thus permitting the jaws under the action of their springs, to return to engagement with the workpiece supported by the machine head and tail stock. At the same time, fluid will flow from the back or rear portions of the cylinders 27 and 29 through the conduits 165, and be discharged through the valve 155. Fluid, under pressure, then flows through valve 155, conduits 173, 169 and 171, to the front ends of the cylinders 27 and 29. The pistons of the cylinders 27 and 29 will thus be retracted and when they reach their fully retracted position the projections 177 on the ends thereof will engage limit switches 201, which in turn will actuate solenoid 187, which controls the four-way valve 185, for indexing cylinder 77. The piston of the indexing cylinder 77 will thus be retracted and the conveyor will be indexed so as to move the workpiece, which was machined, away from the machine 12, and position another workpiece between the head and tail stocks of the machine. When the piston rod is fully retracted, it will engage limit switch 203, which in turn will actuate solenoid 153 and the aforedescribed operating cycle will be repeated. The operation will thus continue until it is stopped by an operator.

It will thus be seen that a single operator can position a plurality of workpieces between the jaws of the conveyor, push a button to start the cycle of operation, and the machining operations, as well as the indexing and conveying of workpieces, will automatically occur thereafter until such time as each workpiece has passed through all of the desired machines and has been completely machined to a finished state.

The mechanism of this invention thus permits the efficient, inexpensive and simple handling of a large number of workpieces for machining operations, and eliminates the use of a large number of operators, which has been heretofore necessary.

What is claimed is:

1. Conveyor mechanism for conveying circular workpieces into and out of position for engagement by a work-engaging element, including a conveyor movable past the work-engaging element, means movably supporting said conveyor, said conveyor including a pair of spaced jaw elements having opposed arcuate relatively smooth and generally concave faces adapted to engage and rotatably support the arcuate surfaces of a circular workpiece therebetween, means pivotally supporting said jaw elements about spaced pivotal axes so that the faces thereof adapted to engage the workpiece may pivot into and out of engagement with the workpiece, resilient means normally urging said jaws toward each other for retaining said jaws in yieldable engagement with the arcuate surfaces of said circular workpiece, each of said jaws including means offset from the pivots thereof and adapted to be actuated for pivoting the workpiece engaging faces of said jaws away from each other, and means supported adjacent said jaws for engaging said offset jaw means and actuating the latter so as to pivot said jaws apart, and means for actuating said jaw-engaging and actuating means.

2. Mechanism for conveying circular workpieces into and out of position for engagement by a work-engaging element, including a conveyor movable past the work-engaging element, means for supporting the conveyor, said conveyor including a pair of spaced jaw members movably supported by said conveyor supporting means, said jaw members having opposed arcuate relatively smooth and generally concave faces adapted to engage the arcuate surfaces of a circular workpiece and rotatably support the workpiece therebetween, means pivotally supporting said jaw members about spaced pivotal axes to that said faces may pivot into and out of engagement with the arcuate surfaces of said circular workpiece, resilient means normally urging said jaw members toward each other for yieldable engagement with the arcuate surfaces of said circular workpiece, means on said jaw members spaced from said pivotal supporting means adapted to be engaged and moved transversely of the axis of said pivotal supporting means so as to cause the workpiece engaging faces of said jaws to pivot away from each other and thereby disengage from a workpiece, and additional means on said conveyor projecting beyond the conveyor supporting means and adapted to be engaged by an indexing element for moving the conveyor along the conveyor supporting means.

References Cited in the file of this patent

UNITED STATES PATENTS

| | | |
|---|---|---|
| 1,644,515 | Dostal | Oct. 4, 1927 |
| 1,753,560 | Emmert | Apr. 8, 1930 |
| 1,864,114 | Angerpointer | June 21, 1932 |
| 1,906,036 | Wunderlich | Apr. 25, 1933 |
| 1,934,835 | Weiss | Nov. 14, 1933 |
| 2,350,412 | Wallace | June 6, 1944 |
| 2,368,525 | Daw | Jan. 30, 1945 |
| 2,389,083 | Rosengren | Nov. 13, 1945 |
| 2,443,293 | Bergstein et al. | June 15, 1948 |
| 2,536,413 | Bauer et al. | Jan. 2, 1951 |
| 2,830,712 | Sykokis | Apr. 15, 1958 |